Dec. 5, 1967  W. L. WILSON  3,356,456

PROCESS FOR PREPARING TITANIUM DIOXIDE

Filed July 22, 1965

INVENTOR
WILLIAM L. WILSON

BY

ATTORNEYS

United States Patent Office 3,356,456
Patented Dec. 5, 1967

3,356,456
PROCESS FOR PREPARING TITANIUM DIOXIDE
William L. Wilson, Barberton, Ohio, assignor to Pittsburgh Plate Glass Company, Pittsburgh, Pa., a corporation of Pennsylvania
Filed July 22, 1965, Ser. No. 474,075
12 Claims. (Cl. 23—202)

ABSTRACT OF THE DISCLOSURE

Pigmentary titanium oxide of improved optical properties is prepared by vapor phase oxidation of titanium tetrahalide with oxygen-containing gas in presence of rutile promoting agent, and at least one source of at least two metallic members selected from Groups IA, IB, IIA, and IIB. Optionally, a source of silicon is also present.

---

Figure 1:
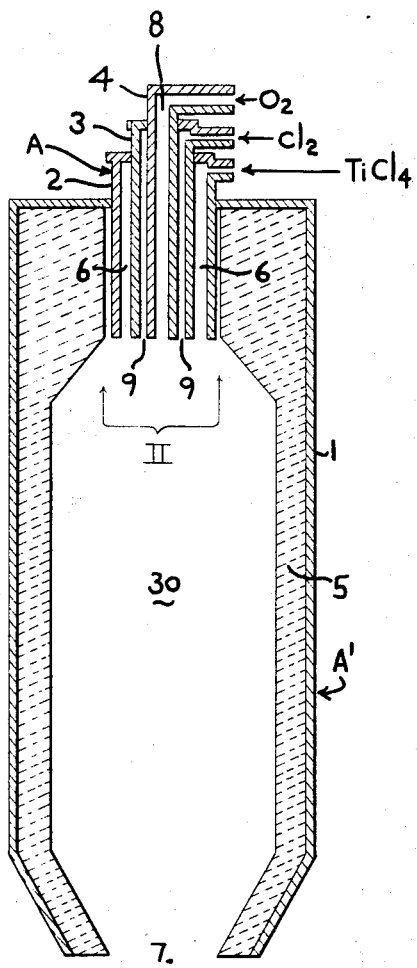

This application is a continuation-in-part of copending application U.S. Serial No. 190,140, filed April 25, 1962, now United States Patent 3,214,284, and copending U.S. patent application Serial No. 255,453, filed February 1, 1963.

This invention relates to a process for producing pigmentary titanium oxide having superior optical properties by the vapor phase oxidation of a titanium tetrahalide selected from the group consisting of titanium tetrachloride, titanium tetraiodide, and titanium tetrabromide.

Titanium oxide is currently produced commercially by at least two different basic processes, the so-called sulfate process and the chloride process. The latter involves the vapor phase reaction of titanium tetrahalide and an oxygenating gas at a temperature of at least 800° C., usually 1000 to 1400° C., in the absence or presence of a fluidized bed, e.g., as disclosed in U.S. Letters Patent 2,964,386, U.S. Letters Patent 2,240,343, issued to Muskat, U.S. Letters Patent 2,394,633, issued to Pechukas et al., or U.S. Letters Patents 2,968,529 and 3,069,281, issued to William L. Wilson. The oxygenating gas may comprise any oxidizing or oxygenating agent, such as oxygen, air, oxides of nitrogen, $H_2O_2$, oxides of phosphorus, or mixtures of same.

Pigmentary titanium oxide has unique optical properties which make it useful, particularly in the paint industry. Such optical properties, for example, tinting strength and undertone, are a function of particle size, dispersion and color. Pigmentary titanium oxide of a given particle size distribution range, e.g., mean diameter of 0.2 to 0.5 micron, may be prepared by the vapor phase oxidation processes of Muskat, Pechukas, or Wilson, noted hereinbefore, as well as by other processes, e.g., Canadian Patent 517,816, issued to Krchma et al., or British patent specifications 876,672 and 922,671.

However, it has been discovered that the surface activity of the titanium oxide particles produced by the aforementioned processes may be such that electrostatic charges or forces are set up between individual particles whereby the particles come together and combine in groups of two or more. Such grouping is termed chaining or aggregation. The result of such grouping, chaining, or aggregation is a deficient pigment having less than optimum dispersibility and decreased optical properties, particularly undertone and tinting strength.

It has been discovered that if titanium oxide is prepared in accordance with the present invention, there is produced a titanium oxide particle having optimum pigmentary properties, particularly tint tone and tinting strength, for a given particle size distribution range. More particularly, there is produced a raw, uncoated pigmentary titanium oxide particle having high, superior dispersion, a tinting strength of at least 1600, usually at least 1700, and a blue undertone (tint tone) for a particle size distribution range below 1.0 micron in mean diameter, preferably 0.2 to 0.5 micron, with a final tinting strength of at least 1780, usually above 1800, when the raw pigment is wet coated with metal oxides, as disclosed by U.S. Patent 3,146,119, or copending U.S. application Serial Number 370,349, filed May 26, 1964.

In the broad practice of this invention, a rutile titanium oxide pigment of superior pigmentary properties is produced by the vapor phase reaction of a selected titanium tetrahalide with an oxygen-containing gas in the presence of a source of a small, effective amount of rutile promoting metallic agent and a small, effective amount of at least one source of at least two metallic members selected from the Groups IA and IB having an atomic weight below 133 and Groups IIA and IIB having an atomic weight below 138 of the Periodic Chart of the Elements found at pages 58 and 59 of Lange's Handbook of Chemistry, sixth edition (1964), published by Handbook Publishers, Inc., Sandusky, Ohio.

In a more specific embodiment of this invention, at least one of the selected metallic members is zinc.

Thus in this more specific embodiment there is added to the vapor phase oxidation a small rutile promoting amount of aluminum and/or zirconium, a small, effective amount of a source of zinc, and a small, effective amount of a source of at least one other metallic member of the group consisting of potassium, rubidium, cesium, beryllium, magnesium, calcium, barium, strontium, cadmium, sodium, lithium, silver, and copper.

Specific combinations envisioned in the practice of this invention include not by way of limitation: a source of Al or Zr plus at least one source of Zn and K; a source of Al or Zr plus at least one source of Zn and Rb; a source of Al or Zr plus at least one source of Zn and Cs; a source of Al or Zr plus at least one source of Zn and an alkaline earth metal selected from the group consisting of Be, Mg, Ca, Sr, and Ba.

Rutile promoting agent as used herein is defined as a source of aluminum or zirconium.

Rutile promoting source is defined as any organic or inorganic compound of aluminum, zirconium, or both, including metallic aluminum or zirconium, which will react with oxygen at the vapor phase reaction temperature (of the titanium tetrahalide and oxygen) to form the corresponding metal oxide although it is not intended to indicate that the source material actually forms such oxide; that is, it is preferred that the source should in this instance be capable of forming the corresponding aluminum or zirconium oxides whether or not such oxides actually are formed during the vapor phase oxidation reaction. In addition, source as herein employed is further defined as also including the oxides of aluminum or zirconium providing such oxide is finely divided, e.g., having a mean particle size diameter of less than 1.0 micron, generally less than 0.5 micron, with best results obtained below 0.15 micron.

The source of the zinc and other metallic members selected from Groups IA, IB, IIA, IIB is defined as any organic or inorganic compound of the metallic members which contains one or more of the various members (including the metallic member in an elemental state), preferably a source which will react with oxygen at the vapor phase reaction temperature to form a corresponding oxide of the selected member although it is not intended to indicate that the source material actually forms such oxide; that is, the source should in this instance be capable of forming a corresponding oxide of the selected metallic member of Groups IA, IB, IIA, IIB whether or not such oxide actually is formed during the vapor phase oxidation reaction. In addition, source as herein employed is further defined as also including any oxide of the selected members providing such oxide has a mean particle size diameter in the range specified for the oxides of aluminum and zirconium hereinbefore.

In addition to additives of aluminum, zirconium, and the selected metals of Groups IA, IB, IIA, and IIB, noted hereinbefore, there may be further added a source of silicon.

Silicon source is defined as any organic or inorganic compound of silicon including elemental metallic silicon which will react with oxygen at the vapor phase reaction temperature to form the corresponding metal oxide although it is not intended to indicate that the source material actually forms such oxide; that is, the source should be capable in this instance of forming the corresponding silicon oxide, e.g., $SiO_2$, whether or not such oxide actually is formed during the vapor phase oxidation reaction. In addition, source is further defined as including the oxides of silicon, such as silica, providing such oxide has a mean particle size below 1.0 micron in diameter as specified for the oxides of aluminum and zirconium hereinbefore.

Figure 3:
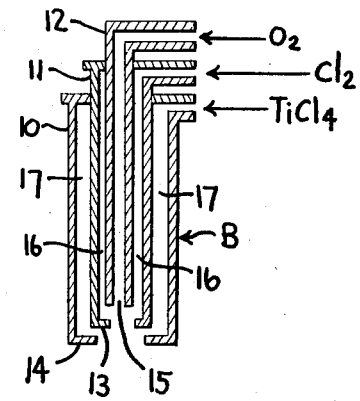
Figure 2:
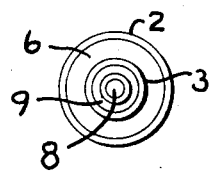

To more specifically describe the process of this invention, reference is made to the drawing, and FIGURES 1 to 3, inclusive, which depict apparatus for practicing the process invention.

FIGURE 1 describes a diagrammatic cross-section view of a concentric orifice-annulus burner fitted in a furnace.

FIGURE 2 further illustrates the construction of the burner of FIGURE 1, representing a view along line I—I of FIGURE 1.

FIGURE 3 illustrates a diagrammatic cross-section view of a burner which may be fitted in the furnace of FIGURE 1 to produce pigmentary titanium dioxide according to the process of this invention.

Referring to FIGURES 1 and 2, reaction zone chamber of furnace A′ comprises a concentric steel shell 1 and an internal lining of firebrick 5 (or other heat resistant insulation). At the lower part of furnace A′ is a conical bottom terminating at outlet 7. At the upper part of furnace A′ is a burner A.

Burner A is composed of three concentric tubes, 2, 3, and 4. Tube 3 is arranged so as to circumscribe tube 4 (forming annulus 6) and tube 2 is arranged so as to circumscribe tubes 3 and 4 (forming annulus 9). Each of the tubes 2 and 3 are evenly spaced from the wall of the tube it circumscribes. This is more clearly shown in FIGURE 2, which shows the tube arrangement taken along line II of FIGURE 1.

In the operation of the reactor of FIGURES 1 and 2, an oxygenating gas typically preheated 900° C. to 1750° C. is fed to the upper opening in tube 4, while an inert gas at room temperature up to the temperature of the oxygenating gas is fed to the opening at the top if tube 3.

The inert gas may comprise chlorine, nitrogen, bromine, iodine, argon, helium, krypton, xenon, carbon dioxide, or mixtures thereof. Concurrently therewith, titanium tetrahalide is fed to the opening at the upper part of tube 2. The titanium tetrahalide has a temperature of 140° C. to about 1200° C.

Referring to FIGURE 3, burner B, which may be fitted in furnace A′ of FIGURE 1 in replacement of burner A, is composed of three concentric tubes annularly arranged. Central oxygenating gas tube 12 is circumscribed by tube 11, which in turn is circumscribed by tube 10 such that there is formed annuli 17 and 16. Tube 11 is provided with an annular lip 13 at its lower end and tube 10 is provided with annular lip 14, such that the titanium tetrahalide and inert gas streams are emitted from the annuli 17 and 16 in a direction substantially perpendicular to the direction of flow of the oxygenating gas from tube 12. In operation, burner B is fed in the same manner as burner A of FIGURE 1.

The source or sources of the various additives, e.g., aluminum, zirconium, metallic members of Groups IA, IB, IIA, IIB, and silicon, can be introduced to the vapor phase reaction together or separately.

Furthermore, such sources can be introduced directly or indirectly to the vapor phase reaction of the titanium tetrahalide and oxygen.

Thus in the practice of this invention, one or more sources of one or more of the aforementioned additives may be added in conjunction with an inert gas, or one or more of the reactants, or both.

When the process is heated by the combustion of a fuel, one or more sources may be added to the fuel or the products of combustion thereof, e.g., a combustible carbon-containing or sulfur-containing fuel or the combustion products thereof when a process is operated in accordance with U.S. Letters Patents 3,069,282 and 3,105,-742.

The source of each selected additive may also be added directly to the reaction zone 30 independently of the reactants, inert gases, or combustible fuels; e.g., one or more sources may be added directly to the reaction zone as an atomized spray in a solid, liquid, or gaseous state.

Furthermore, one or more metallic additives may be added to the zone 30 by employing an inner furnace wall 5 constructed of a ceramic or firebrick material which contains one or more sources of one or more additives, e.g., one or more compounds of aluminum, zirconium, zinc, alkali metal, or alkaline earth metals. Such source material is gradually eroded into the reaction zone due to the high temperature and corrosive nature of the environment in zone 30, as noted, for example, in British patent specification 672,753.

One or more additives, particularly potassium, may also be introduced into the reaction zone by employing a ceramic dedusting edge, as disclosed in copending U.S. application Serial No. 379,825, filed July 2, 1964, which contains a source of the particular additive, e.g., lava stone containing about 0.5 to 1.5 percent by weight potassium.

Likewise, the additive may be introduced to the zone 30 by using a baffle as disclosed in copending U.S. application Serial No. 376,980, filed June 22, 1964, which is constructed out of the selected additive or a source of the additive.

Such sources may also be added directly to the zone 30 or to one or more inert or reactant gas streams by emitting the source from one or more plasma arc electrodes as disclosed, for example, in copending U.S. patent application Serial No. 354,597, filed March 25, 1964.

The aluminum and/or zirconium source is added to the vapor phase oxidation reaction in an amount sufficient to insure the presence of 0.5 to 10.0 mole percent of aluminum and/or zirconium, basis the moles of titanium oxide formed; equivalent to about 0.17 to 3.38 percent by weight metallic aluminum and about 0.57 to 11.40 percent by weight zirconium, based on the weight of the titanium oxide pigment formed.

Best results are obtained when the source of aluminum and/or zirconium is added in a small, effective amount equivalent to less than 3.0 percent by weight aluminum and less than 4.5 percent by weight zirconium, based on the titanium oxide pigment formed.

The selected metallic source (or sources) of zinc and the other metallic members of Groups IA, IB, IIA, and IIB may be added to the vapor phase oxidation reaction in amounts ranging from 0.01 to 10,000 parts by weight of each selected metal ion per million parts by weight of titanium oxide obtained from the oxidation reaction. Generally, there is added less than 6,000 parts by weight of the metal ion with best results being obtained with 5 to 5,000 parts by weight of the metal ion per million parts by weight of titanium oxide formed by the oxidation reaction. With certain selected highly active metal ions such as potassium it may be more desirable to add substantially less than 1,000 parts by weight per million parts by weight titanium oxide.

If silicon source is also added to the reaction, it is added in an amount sufficient to insure the presence of 0.001 to 2.7, preferably 0.01 to 2, mole percent silicon, basis the moles of titanium oxide pigment product formed by the reaction; that is, 0.00035 to about 0.945, preferably 0.0035 to 0.70, percent by weight silicon ion based on the weight of the titanium oxide pigment formed. Although favorable results are obtained in the range of 0.2 to 1.2 mole percent silicon ion per mole of titanium oxide formed, equivalent to 0.07 to 0.42 percent by weight titanium oxide, best results being obtained particularly in the presence of aluminum and zinc or potassium ion when the silicon ion is added in a small, effective amount of less than 0.3 percent by weight, based on the weight of the titanium oxide.

The total metallic ions added to the reaction (e.g., Zr, Si, Zn, K, etc.) should not exceed 10 percent by weight of the titanium oxide formed with more effective results being obtained below 6.0 percent by weight. Best results are obtained below 4.0 percent.

Specific sources of aluminum include, not by way of limitation, metallic aluminum, organic and inorganic compounds containing aluminum including oxides, hydroxides, nitrates, nitrides, sulfides, sulfates, and halides such as $Al(C_2H_3O_2)_3$ (aluminum acetate), $Al(OH)(C_2H_3O_2)_2$ (aluminum acetate, basic), $AlC_6H_5O_7$ (aluminum citrate), $AlCl_3$, $AlCl$, $AlBr_3$, $AlBr$, $AlI_3$, $AlI$, $AlF_3$, $AlF$, $Al(ClO_3)_3 \cdot 6H_2O$ (aluminum chlorate), $Al(OH)_3$, $Al_2O_3$, $Al(NO_3)_3 \cdot 9H_2O$, $Al_2N_2$, $Al(SO_4)_3$, $Al_2S_3$, $H_3AlF_6$, $AlN$ the aluminum ammonium halides such as $AlCl_3 \cdot NH_3$, $NH_4Al(SO_4)_2$, and aluminum containing esters, for example, aluminum compounds containing one or more organic ester radicals with one to ten carbon atoms per radical, e.g., $Al(OC_3H_7)_3$ (aluminum isopropylate or isopropoxide).

Likewise, there may be employed, not by way of limitation, aluminum compounds containing other organic radicals such as hydrocarbons, e.g. paraffins, cycloparaffins, olefins, acetylenes, aromatics, alcohols, phenols, ethers, carbonyls, amines, and benzene rings. Furthermore, there may be used alloys of aluminum providing such alloys are capable of being oxidized. It may in some instances be necessary to use particular alloys in a finely divided state, e.g., of a particle size below 3.0 microns, in order to enhance oxidation.

Specific sources of zirconium include, not by way of limitation, metallic zirconium, organic and inorganic compounds containing zirconium including oxides, hydroxides, oxalates, nitrates, nitrides, sulfides, sulfates, halides, and oxyhalides such as $ZrBr_4$, $ZrCl_4$, $ZrF_4$, $ZrI_4$, $Zr(OH)_4$, $Zr \cdot (NO_3)_4 \cdot 5H'O$, $ZrO_2$, $Zr(C_2O_4)_2 \cdot 2Zr(OH)_4$ (zirconium oxalate, basic), $Zr(SO_4)_2 \cdot 4H_2O$, $ZrCl(OH)_3 \cdot 3H_2O$, $ZrF(OH)_3 \cdot 3H_2O$, $ZrBr(OH)_3 \cdot 3H_2O$ $ZrI(OH)_3 \cdot 3H_2O$, $ZrOCl_2 \cdot 8H_2O$, $ZrOF_2 \cdot 8H_2O$ $$ZrOBr_2 \cdot 8H_2O$$

$ZrOI_2 \cdot 8H_2O$, and zirconium compounds containing one or more organic radicals, e.g., hydrocarbons, esters, benzene rings, alcohols, olefins, etc., as listed for aluminum. There may also be used alloys of zirconium, providing such alloys are capable of being oxidized. Such alloys may necessarily have to be employed in a finely divided state as noted for the aluminum alloys.

The zinc ion source can be metallic zinc or a zinc compound. Examples, not by way of limitation, of zinc compounds include both organic and inorganic compounds such as $Zn(C_2H_3O_2)_2$ (zinc acetate), $Zn(C_2H_3O_2)_2 \cdot H_2O$, $ZnAl_2O_4$ (zinc aluminate), $Zn(NH_2)_2$ (zinc amide), $Zn(C_7H_5O_2)_2$ (zinc benzoate), $3ZnO \cdot 2B_2O_3$ (zinc borate), $Zn(BrO_3)_2 \cdot 6H_2O$ (zinc bromate), $ZnBr_2$ (zinc bromide), $Zn(C_4H_7O_2)_2 \cdot 2H_2O$ (zinc butyrate), $$Zn(C_6H_{11}O_2)_2$$

(zinc caproate), $ZnCO_3$ (zinc carbonate), $$Zn(ClO_3)_2 \cdot 4H_2O$$

(zinc chlorate), $ZnCl_2$ (zinc chloride), $ZnCrO_4$ (zinc chromate), $ZnCr_2O_7 \cdot 3H_2O$ (zinc dichromate), $$Zn_3(C_6H_5O_7)_2 \cdot 2H_2O$$

(zinc citrate), $Zn(CN)_2$ (zinc cyanide, $$Zn(H_2O)_6GaF_5 \cdot 5H_2O$$

(zinc fluogallate), $ZnF_2$ (zinc fluoride), $ZnSiF_6 \cdot 6H_2O$ (zinc fluosilicate), $Zn(HSO_2 \cdot CH_2O)_2$, $Zn((OH)HSO_2 \cdot CH_2O$ (zinc formaldehydesulfoxylate), $Zn(CHO_2)_2$ (zinc formate), $ZnC_4H_4O_6 \cdot H_2O$, $$ZnC_4H_4O_6 \cdot 2H_2O$$

(zinc tartrate), $Zn(SCN)_2$ (zinc thiocyanate), $$Zn(C_5H_9O_2)_2 \cdot 2H_2O$$

(zinc valerate), $[Zn(NH_3)2]Cl_2$ (zinc diaminezinc chloride), $Zn(CH_2CH_2CH_2CH_3)_2$ (zinc di-n-butylzinc), $$Zn(C_2H_5)_2$$

(zinc diethylzinc), $Zn(CH_3)_2$ (zinc dimethylzinc), $$Zn(C_6H_5)_2$$

(zinc diphenylzinc), $Zn(CH_2CH_2CH_3)_2$ (zinc di-n-propylzinc), $Zn(C_6H_4CH_3)_2$ (zinc di-o-toylzinc), $$Zn(CHO_2)_2 \cdot 2H_2O$$

(zinc formate), $ZnGa_2O_4$ (zinc gallate), $ZnC_3H_7O_6P$ (zinc glycerophosphate), $Zn(OH)_2$ (zinc hydroxide)

$$Zn(IO_2)_2$$

(zinc iodate), $Zn(IO_2)_2 \cdot 2H_2O$, $ZnI_2$ (zinc iodride), $$Zn(C_3H_3O_2)_2 \cdot 3H_2O$$

(zinc di-lactate), $Zn(C_3H_3O_2)_2 \cdot 2H_2O$ (zinc di-lactate), $Zn(C_{11}H_{11}O_2)_2$ (zinc laurate), $Zn(MnO_4)_2 \cdot 8H_2O$ (zinc permanganate), $Zn(NO_3)_2 \cdot 3H_2O$ (zinc nitrate), $ZnN_2$ (zinc nitride), $ZnO$ (zinc oxide), $Zn(C_4H_7O_2)_2$ (zinc acetylacetonate), $Zn(C_4H_5O_4)_2$ (zinc 1-phenol-4-sulfonate, $Zn_3(PO_4)_2$ (zinc ortho phosphate), $$Zn_3(PO_4)_2 \cdot 4H_2O$$

$Zn_3(PO_4)_2 \cdot 8H_2O$, $Zn_3(PO_4)_2 \cdot 2H_2O$, $Zn_2P_2O_7$ (zinc pyrophosphate), $Zn_2P_2$ (zinc phosphide), $Zn(H_2PO_2 \cdot H_2O$ (zinc hypophosphite), zinc picrate, $Zn(C_7H_5O_3)_2 \cdot 3H_2O$ (zinc salicylate), $ZnSeO_4 \cdot 5H_2O$ (zinc selenate), $$ZnC_2O_4 \cdot 2H_2O$$

$ZnC_2O_4$ (zinc oxalate), zinc oleate, $ZnSiO_2$ (zinc metasilicate), zinc stearate, $ZnSO_4$ (zinc sulfate), hydrates of zinc sulfate, $ZnS$, $ZnS \cdot H_2O$, $ZnSO_2$ (zinc sulfite). Likewise, zinc alloys may be used.

The cadmium ion source can be elemental cadmium or a cadmium compound, e.g., compounds similar to those for zinc listed hereinbefore. Cadmium compounds thus comprise both organic and inorganic including $Cd(C_2H_3O_2)_2$ (cadmium acetate),
$Cd(BrO_3)_2 \cdot H_2O$,
$CdBr_2$,
$CdCO_3$,
$Cd(ClO_3)_2 \cdot 2H_2O$,
$CdCl_2$,
$Cd(CN)_2$,
$CdS_2O_6 \cdot 6H_2O$ (cadmium dithionate),
$Cd_2Fe(CN)_6$,
$CdF_2$,
$Cd(HCO_2)_2 \cdot 2H_2O$,
$Cd(OH)_2$,
$Cd(IO_3)_2$,
$CdI_2$,
$Cd(C_3H_5O_3)_2$ (cadmium lactate),
$Cd(NO_3)_2$,
$CdO$,
$Cd_2O$,
$CdSeO_4$,
$CdSe$,
$CdSO_4$,
$CdSO_4 \cdot H_2O$,
$CdS$,
$CdSO_3$, cadmium alkali metal halides such as CdCl$_2$·4NH$_4$Cl and
CdBr$_2$·4KCl,
Cd(COO)$_2$ (cadmium oxalate),
Cd(C$_7$H$_5$O$_3$)$_2$·H$_2$O (cadmium salicylate), as well as alloys of cadmium.

The potassium ion source can be elemental potassium or a potassium compound. Examples, not by way of limitation, of potassium compounds include both organic and inorganic compounds such as KHC$_6$H$_8$O$_8$ (potassium saccharate acid),
KOC$_6$H$_4$NO$_2$·2H$_2$O (potassium-m-nitrophen oxide or potassium-p-nitrophen oxide),
KHC$_4$H$_4$O$_4$·C$_4$H$_6$O$_4$ (potassium hydrogen succinate),
K$_2$SO$_4$ (potassium sulfate),
KHSO$_4$ (potassium hydrogen sulfate),
K$_2$S$_2$O$_7$ (potassium pyrosulfate),
K$_2$S$_2$O$_8$ (potassium peroxydisulfate),
K$_2$S (potassium monosulfide),
K$_2$S·5H$_2$O,
KHS (potassium hydrosulfide),
K$_2$S$_2$ (potassium disulfide),
K$_2$S$_2$·3H$_2$O,
K$_2$S$_3$ (potassium trisulfide),
K$_2$S$_4$ (potassium tetrasulfide),
K$_2$S$_2$·2H$_2$O,
K$_2$S$_5$ (potassium pentasulfide),
K$_2$SO$_3$·2H$_2$O,
KHSO$_3$,
K$_2$S$_3$O$_5$ (potassium pyrosulfite),
K$_2$C$_4$H$_4$O$_6$·½H$_2$O (potassium d-tartrate),
K$_2$C$_4$H$_4$O$_6$,
KHC$_4$H$_4$O$_6$ (potassium hydrogen d-tartrate),
K$_2$H$_4$TeO$_6$·3H$_2$O (potassium orthotellurate),
K$_2$CS$_3$ (potassium trithiocarbonate),
KSCN (potassium thiocyanate),
K$_2$S$_2$O$_6$ (potassium dithionate),
K$_2$S$_3$O$_6$ (potassium trithionate),
K$_2$S$_4$O$_6$ (potassium tetrathionate),
2K$_2$S$_5$O$_6$·3H$_2$O (potassium pentathionate),
K$_2$SnS$_3$·3H$_2$O,
3K$_2$S$_2$O$_3$·H$_2$O (potassium thiosulfate),
3K$_2$S$_2$O$_3$·5H$_2$O,
KHC$_5$H$_2$N$_4$O$_3$ (potassium acid urate),
KC$_2$H$_3$O$_2$ (potassium acetate),
KC$_2$H$_3$O$_2$·HC$_2$H$_3$O$_2$ (potassium acid acetate),
KC$_9$H$_7$O$_4$·2H$_2$O (potassium acetylsalicylate),
KNH$_2$ (potassium amide),
KNH$_4$C$_4$H$_4$O$_6$ (potassium ammonium tartrate),
KAuO$_2$·xH$_2$O,
KN$_3$ (potassium azide),
KC$_7$H$_5$O$_2$·3H$_2$O (potassium benzoate),
K$_2$B$_2$H$_6$ (potassium diborane),
K$_2$B$_2$H$_6$O$_2$ (potassium dihydroxy diborane),
K$_2$B$_5$H$_9$ (potassium pentaborane),
KBO$_2$ (potassium metaborate),
K$_2$B$_4$O$_7$·8H$_2$O (potassium tetraborate),
KB$_5$O$_8$·4H$_2$O (potassium pentaborate),
KBO$_3$·½H$_2$O (potassium peroxyborate),
KC$_4$H$_4$BO$_7$ (potassium borotartrate),
KBrO$_3$ (potassium bromate),
KBr (potassium bromide),
KAuBr$_4$,
K$_2$CrO$_4$·2Cr(OH)CrO$_4$ (potassium chromium chromate, basic),
KCr(SO$_4$)$_2$·12H$_2$O (potassium chromium sulfate),
K$_3$C$_6$H$_5$O$_7$·H$_2$O (potassium citrate),
KH$_2$C$_6$H$_5$O$_7$ (potassium citrate, monobasic),
KOCN (potassium cyanate),
KCN (potassium cyanide),
KC$_2$H$_5$SO$_4$ (potassium ethyl sulfate),
K$_2$GeF$_6$ (potassium fluogermanate),
K$_2$C$_20$H$_{10}$O$_5$ (potassium fluorescein derivative), KPF$_6$ (potassium hexafluorophosphate),
KF (potassium fluoride),
KF·2H$_2$O,
KHF$_2$,
KAu(CN)$_2$,
KBF$_4$ (potassium fluoborate),
K$_2$HPO$_3$ (potassium mono hydrogen orthophosphite),
KH$_2$PO$_3$ (potassium di hydrogen orthophosphite),
KHC$_8$H$_4$O$_4$ (potassium hydrogen phthalate),
KC$_6$H$_2$N$_3$O$_7$ (potassium picrate),
KC$_{12}$H$_8$O$_4$ (potassium piperate),
KC$_3$H$_5$O$_2$·H$_2$O (potassium propionate),
KC$_3$H$_7$SO$_4$ (potassium propyl sulfate),
KHC$_6$H$_8$O$_8$ (potassium acid-d-saccharate),
KC$_7$H$_5$O$_3$ (potassium salicylate),
KC$_{15}$H$_{19}$O$_4$ (potassium santoninate),
KC$_{18}$H$_{35}$O$_2$ (potassium stearate),
K$_2$C$_4$H$_4$O$_4$·3H$_2$O (potassium succinate),
KHC$_4$H$_4$O$_4$ (potassium hydrogen succinate),
KHC$_4$H$_4$O$_4$·2H$_2$O,
KFSO$_3$ (potassium fluosulfonate),
K$_2$ThF$_6$·4H$_2$O (potassium fluothorate),
K$_2$TiF$_6$·H$_2$O (potassium fluotitanate),
KCHO$_2$ (potassium formate),
K$_2$C$_3$H$_7$PO$_6$ (potassium glycerophosphate),
KH (potassium hydride),
KOH (potassium hydroxide),
KIO$_3$ (potassium iodate),
KIO$_3$·HIO$_3$ (potassium acid iodate),
KIO$_3$·2HIO$_3$,
KIO$_4$ (potassium metaperiodate),
KI,
KI$_3$ (potassium triiodide),
KCl,
KCl$_3$,
KF,
KF$_3$,
KBr,
KBr$_3$,
KC$_3$H$_5$O$_3$·xH$_2$O (potassium lactate),
KC$_{12}$H$_{23}$O$_2$ (potassium laurate),
K$_2$C$_4$H$_4$O$_5$ (potassium malate),
K$_2$CH$_2$(SO$_3$)$_2$ (potassium methionate),
2KCH$_3$SO$_4$·H$_2$O (potassium methyl sulfate),
K$_2$C$_{10}$H$_6$(SO$_3$)$_2$·2H$_2$O (potassium naphthalene-1,5-disulfonate),
KIBr$_2$ (potassium dibromoiodide),
K$_2$SnBr$_6$,
K$_2$C$_{10}$H$_{14}$O$_4$·5H$_2$O (potassium d-camphorate),
K$_2$CO$_3$ (potassium carbonate),
K$_2$CO$_3$·xH$_2$O,
KHCO$_3$ (potassium hydrogen carbonate),
K$_2$C$_2$O$_6$ (potassium peroxy-carbonate),
(KCO)$_6$ (potassium carbonyl),
KClO$_3$ (potassium chlorate),
KClO$_4$ (potassium perchlorate),
KClO,
KICl$_4$ (potassium chloroiodate),
KICl$_2$,
K$_2$OSCl$_6$ (potassium chloroosmate),
K$_2$RhCl$_5$ (potassium pentachlorohodite),
K$_2$CrO$_4$ (potassium chromate),
K$_2$Cr$_2$O$_7$ (potassium dichromate),
K$_3$CrO$_8$ (potassium peroxychromate),
KNO$_3$ (potassium nitrate),
K$_3$N (potassium nitride),
KNO$_2$ (potassium nitrite),
KC$_{18}$H$_{33}$O$_2$ (potassium oleate),
KC$_{18}$H$_{33}$O$_2$C$_{18}$H$_{34}$O$_2$ (potassium acid oleate),
K$_2$OsO$_4$·2H$_2$O (potassium osmate),
K$_2$C$_2$O$_4$·H$_2$O (potassium oxalate),
KHC$_2$O$_4$ (potassium hydrogen oxalate),
KHC$_2$O$_4$·½H$_2$O,
KHC$_2$O$_4$·H$_2$O,
KHC$_2$O$_4$·2H$_2$O, $K_2O$,
$K_2O_2$,
$K_2O_3$,
$KO_2$,
$KC_6H_5SO_4$ (potassium phenyl sulfate),
$K_3PO_4$,
$K_2HPO_4$,
$K_4P_2O_7 \cdot 3H_2O$ (potassium pyrophosphate),
$KPO_3$.

Likewise, the corresponding compounds of other alkali metals such as sodium and lithium as well as cesium and rubidium may be used as sources of the respective ion, e.g., sodium, lithium, cesium, and rubidium.

Thus, the cesium ion source can be elemental cesium or a cesium compound similar to the K compounds noted hereinbefore. Examples, not by way of limitation of cesium compounds, include both organic and inorganic compounds as $CsC_2H_3O_2$ (cesium acetate), $CsC_7H_5O_2$ (cesium benzoate), $CsBrO_3$ (cesium bromate), $CsBr$ (cesium monobromide), $CsBr_3$ (cesium tribromide), $CsBrClI$ (cesium bromchloroiodide), $CsIBr_2$ (cesium dibromoiodide), $CsI_2Br$ (cesium bromodiiodide), $Cs_2CO_3$ (cesium carbonate), $CsHCO_3$ (cesium carbonate hydrogen), $CsClO_3$ (cesium chlorate), $CsClO_4$ (cesium perchlorate), $CsCl$ (cesium chloride), $CsAuCl_4$ (cesium chloroaurate), $CsBr_2Cl$ (cesium chlorodibromide), $CsBrCl_2$ (cesium dichlorobromide), $CsICl_2$ (cesium dichloroiodide), $Cs_2SnCl_6$ (cesium chlorostannate), $Cs_2CrO_4$ (cesium chromate), $CsCn$ (cesium cyanide), $CsF$ (cesium fluoride), $CsCHO_2$ (cesium formate), $CsCHO \cdot H_2O$, $CsH$ (cesium hydride), $CsOH$ (cesium hydroxide), $CsIO_3$ (cesium iodate), $CsIO_4$ (cesium metaperiodate), $CsI$ (cesium monoiodide), $CsI_3$ (cesium triiodide), $CsI_5$ (cesium pentaiodide), $CsCl_5$, $CsBr_5$, $CsF_5$, $CsNO_3$ (cesium nitrate), $CsNO_3 \cdot HNO_3$ (cesium hydrogen nitrate), $CsNO_3 \cdot 2HNO_3$ (cesium dihydrogen nitrate), $CsNO_2$ (cesium nitrite), $Cs_2C_2O_4$ (cesium oxalate), $Cs_2O$ (ceseium monoxide), $Cs_2O_2$ cesium peroxide), $Cs_2O_3$ (cesium trioxide), $CsO_2$ (cesium superoxide), $CsHC_8H_4O_4$ (cesium hydrogen phthalate), $CsRh(SO_4)_2 \cdot 12H_2O$ (cesium rhodium sulfate), $CsC_7H_5O_3$ (cesium salicylate), $Cs_2SO_4$ (cesium sulfate), $CsHSO_4$ (cesium hydrogen sulfate), $Cs_2S \cdot 4H_2O$ (cesium sulfide), $Cs_2S_2$ (cesium disulfide), $Cs_2S_2 \cdot H_2O$, $Cs_2S_3$ (cesium tetrasulfide), $Cs_2S_5$ (cesium pentasulfide), $Cs_2S_6$ (cesium hexasulfide).

The rubidium ion source can be elemental rubidium or a rubidium compound, e.g., similar to the potassium and cesium compounds noted hereinbefore. Examples, not by way of limitation of rubidium compounds, include both organic and inorganic compounds such as $RbC_2H_3O_2$ (rubidium acetate), $RbAl(SO_4)_2 \cdot 12H_2O$ (rubidium aluminum sulfate), $RbBrO_3$ (rubidium bromate), $RbBr$ (rubidium bromide), $RbBr_3$ (rubidium tribromide), $RbIBrCl$ (rubidium bromochloroiodide), $RbIBr_2$ (rubidium dibromoiodide), $RbBrCl_2$ (rubidium dichlorobromide), $RbBr_2Cl$ (rubidium chlorodibromide), $Rb_2CO_3$ (rubidium carbonate), $RbHCO_3$, $RbClO_3$ (rubidium chlorate), $RbClO_4$ (rubidium perchlorate), $RbCl$ (rubidium chloride), $RbICl_2$ (rubidium dichloroiodide), $Rb_2CrO_4$ (rubidium chromate), $Rb_2Cr_2O_7$ (rubidium dichromate), $RbF$ (rubidium fluoride), $Rb_2SiF_6$ (rubidium fluosilicate), $RbFSO_3$ (rubidium fluosulfonate), $RbH$ (rubidium hydride), $RbOH$ (rubidium hydroxide), $RbIO_3$ (rubidium iodate), $RbIO_4$ (rubidium metaperiodate)$_3$, $RbI$ (rubidium iodide), $RbI_3$ (rubidium triiodide), $RbI \cdot 4SO_2$, $RbMnO_4$ (rubidium permanganate), $RbNO_3$ (rubidium nitrate), $RbNO_3 \cdot HNO_3$ (rubidium hydrogen nitrate), $RbNO_3 \cdot 2HNO_3$, $Rb_2O$ (rubidium monoxide), $Rb_2O_3$, $Rb_4O_6$ (rubidium trioxide), $RbO_2$ (rubidium superoxide), $Rb_2SO_4$ (rubidium sulfate), $RbHSO_4$ (rubidium hydrogen sulfate), $Rb_2S$ (rubidium monosulfide), $Rb_2S \cdot 4H_2O$, $Rb_2S_2$ (rubidium disulfide), $Rb_2S_3$ (rubidium trisulfide), $Rb_2S_5$ (rubidium pentasulfide), $Rb_2S_6$ (rubidium hexasulfide), $RbHC_4H_4O_6$, $Rb_2O_2$ (rubidium peroxide).

Specific sources of sodium or lithium ion would include elemental sodium and lithium as well as compounds of all the classes listed for potassium, cesium, and rubidium hereinbefore, particularly the halides and oxides.

Likewise, alloys or ceramics containing one or more of the Group IA elements may be employed, particularly where such alloy or ceramic is in a finely divided state.

Specific sources of the Group IIA metals include the metals in an elemental state as well as organic and inorganic compounds including the acetates, amides, borides, bromates, halides (including chlorides, iodides, bromides, fluorides), oxyhalides, carbonates, chlorates, chromates, citrates, hydrides, sulfides, sulfates, hypochlorites, nitrates, nitrites, oxides, silicates, aluminates of beryllium, magnesium, calcium, barium, and strontium. Alloys may also be employed as noted for the Group IB metals.

Sources of the Group IB metals, copper and silver, include the metals in elemental state, alloys, organic and inorganic compounds including the hydrides, nitrides, peroxides, suboxides, acetates, halides, sulfates, sulfides, bromates, esters, and nitrates such as $CU(C_2H_3O_2)_2$ (cupric acetate), $CuCl_2 \cdot 2NH_4Cl \cdot 2H_2O$ (cupric ammonium chloride), $CuSO_4 \cdot 4NH_3 \cdot H_2O$, $Cu(BrO_3)_2 \cdot 6H_2O$, $Cu_3B_2$, $Cu_2H_2$, $Cu_3N$, $CuO_2 \cdot H_2O$, $Cu_4O$, $CuCl$, $Cu_2Cl_2$, $CuBr$, $Cu_2Br_2$, $CuI$, $Cu_2I_2$, $CuF$, $Cu_2F_2$, $CuSCN$, $(C_6H_5COO)_2Cu \cdot 2H_2O$ (copper benzate) and $AgNO_2$, $Ag_2O$, $AgCl$, $AgBr$, $AgI$, $AgF$, $AgBrO_3$, $CH_3COOAg$ (silver acetate), $Ag_2Cr_2O_7$, $KAg(CN)_2$, and silver phenolsulfonate.

Specific silicon compounds include, not by way of limitation, metal silicon, organic and inorganic compounds such as the silicon hydrides or silanes such as $SiH_4$ (monosilane), $Si_2H_6$ (disilane). $Si_3H_8$ (trisilane), $Si_4H_{10}$ (tetrasilane), $Si_5H_{12}$ (pentasilane), $Si_6H_{14}$ (hexasilane), $Si_7H_{16}$, $Si_8H_{18}$, $Si_9H_{20}$, $Si_{10}H_{22}$; alkylsilanes such as $CH_3SiH_3$ (monomethylsilane), $(CH_3)_2SiH_2$ (dimethylsilane), $$(CH_3)_3SiH$$

(trimethylsilane), $C_2H_5SiH_3$ (monoethylsilane), $$(C_2H_5)_2SiH_2$$

(diethylsilane), $(C_2H_5)_3SiH$ (triethylsilane), $(CH_3)_4Si$ (silicon tetramethyl), $(C_2H_5)_4Si$ (silicon tetraethyl), $$(C_3H_7)SiH_3, (C_3H_7)_2SiH_2, (C_3H_7)_3SiH$$

$(C_3H_7)_4Si$ (silicon tetrapropyl), $C_4H_9SiH_3$, $(C_4H_9)_2SiH_2$, $(C_4H_9)_3SiH$, $(C_4H_9)_4Si$ (silicon tetrabutyl), $C_5H_{11}SiH_3$, $(C_5H_{11})_2SiH_2$, $(C_5H_{11})_3SiH$, $(C_5H_{11})_4Si$ (silicon tetraisoamyl), $(C_6H_{13}SiH_3$, $(C_6H_{13})_2SiH_2$, $(C_6H_{13})_3SiH$, $$(C_6H_{13})_4Si, C_7H_{15}SiH_3, (C_7H_{15})_2SiH_2, (C_7H_{15})_3SiH$$

$$(C_7H_{15})_4Si$$

$(C_6H_5)_4Si$ (silicon tetraphenyl),
$(C_7H_7)_4Si$ (silicon tetra-m-tolyl or tetra-p-tolyl),
$(C_6H_5CH_2)_4Si$ (silicon tetrabenzyl),
$(C_{12}H_9)_4Si$ (silicon tetraxenyl),
$(CH_3)_3C_6H_5Si$ (trimethylphenylsilane),
$(CH_3)_2(C_6H_5)_2Si$ (dimethyldiphenylsilane),
$CH_3(C_6H_5)_3Si$ (methyltriphenylsilane),
$(C_2H_5)_3C_6H_5Si$ (triethylphenylsilane),
$(C_2H_5)_2(C_6H_5)_2Si$ (diethyldiphenylsilane),
$C_2H_5(C_6H_5)_3Si$ (ethyltriphenylsilane),
$(CH_3)(C_2H_5)(n-C_3H_7)(C_6H_5)Si$ methylethylpropylphenylsilane),
$(C_2H_5)(n-C_3H_7)(i-C_4H_9)(CH_2C_6H_5)Si$ (ethyl-n-propyl-i-butylbenzylsilane),
$(C_6H_5)_3SiH$ (triphenylsilane),
$(C_6H_5CH_2)_3SiH$ (tribenzylsilane);
organosilicon halides or alkylhalosilanes such as $$CH_3SiH_2Cl, CH_3SiHCl_2, CH_3SiCl_3, CH_2ClSiH_3$$
$$CHCl_2SiH_3, CCl_3SiH_3, CHCl_2SiH_2Cl, CH_2ClSiHCl_2$$
$$CH_2ClSiH_2Cl, C_2H_5SiH_2Cl, C_2H_5SiHCl_2, C_2H_5SiCl_3$$
$$C_2H_7SiH_2Cl, C_3H_7SiHCl_2, C_3H_7SiCl_3;$$

silicon halides such as $SiCl_4$ (silicon tetrachloride), $SiBr_4$ (silicon tetrabromide), $SiI_4$ (silicon tetraiodide), $SiF_4$ (silicon tetrafluoride), $SiH_3Cl$ (monochlorosilane), $SiH_2Cl_2$ (dichlorosilane), $SiHCl_3$ (trichlorosilane), $SiH_3Br$ (monobromosilane), $SiH_2Br_2$ (dibromosilane), $SiHBr_3$ (tribromosilane), $SiH_3I$ (monoiodosilane), $SiH_2I_2$ (diiodosilane), $SiHI_3$ (triiodosilane), $SiH_3F$ (monofluorosilane), $SiH_2F_2$ (difluorosilane), $SiHF_3$ (trifluorosilane), $SiCl_2$ (silicon dichloride), $SiBr_2$ (silicon dibromide), $SiI_2$ (silicon diiodide), $SiF_2$ (silicon difluoride), $Si_2Cl_6$ (silicon trichloride), $Si_2Br_6$ (silicon tribromide), $Si_2I_6$ (silicon triiodide), $Si_2F_6$ (silicon trifluoride), $SiHCl_3$ (silicon iodotrichloride), $SiI_2Cl_2$ (silicon iododichloride), $SiBrCl_3$ (silicon bromotrichloride), $SiBr_2Cl_2$ (silicon bromodichloride), $SiFCl_3$ (silicon fluorotrichloride), $SiF_2Cl_2$ (silicon fluorodichloride), $Si_3Cl_8$, $Si_3Br_8$, $Si_3I_8$, $Si_3F_8$, $Si_4Cl_{10}$, $Si_4Br_{10}$, $Si_4I_{10}$, $Si_4F_{10}$, $Si_5Cl_{12}$, $Si_5Br_{12}$, $Si_5I_{12}$, $Si_5F_{10}$, $Si_6Cl_{14}$, $Si_6Br_{14}$, $Si_6I_{14}$, $Si_6F_{14}$, $SiIBr_3$, $SiI_2Br_2$, $SiFBr_3$, $SiF_2Br_2$, $SiClBr_3$, $SiBrI_3$, $SiClI_3$, $SiFI_3$, $SiF_2I_2$, $SiIF_3$, $SiClF_3$, $SiBrF_3$, $Si_3Cl_7F$, $Si_3Cl_6F_2$, $Si_3Cl_5F_3$, $Si_3Cl_4F_4$, $Si_3Cl_3F_5$, $Si_3Cl_2F_6$, $Si_3ClF_7$, $Si_3Cl_7I$, $Si_3Cl_6I_2$, $Si_3Cl_5I_3$, $Si_3Cl_4I_4$, $Si_3Cl_3I_5$, $Si_3Cl_2I_6$, $SiClI_7$, $Si_3Cl_7Br$, $Si_3Cl_6Br_2$, $Si_3Cl_5I_3$, $Si_3Cl_4I_4$, $Si_3Cl_5I_3$, $Si_3Cl_6I_2$, $Si_3ClI_7$, $Si_3F_7Br$, $Si_3F_6Br_2$, $Si_3F_5Br_3$, $Si_3F_4Br_4$, $Si_3F_6Br_2$, $Si_3F_7I$, $Si_3F_6I_2$, $Si_3F_5I_3$, $Si_3F_4I_4$, $Si_3F_6I_2$, $Si_3Br_7I$, $Si_3Br_6I_2$, $Si_3Br_5I_3$, $Si_3Br_4I_4$, $Si_3Br_3I_5$, $Si_3Br_2I_6$, $Si_3BrI_7$, $Si_4Cl_9I$, $Si_4Cl_8I_2$, $Si_4Cl_7I_3$, $Si_4Cl_6I_4$, $Si_4Cl_5I_5$, $Si_4Cl_4I_6$, $Si_4Cl_3I_7$, $Si_4Cl_2I_8$, $Si_4ClI_9$, $Si_4Cl_9Br$, $Si_4Cl_8Br_2$, $Si_4Cl_7Br_3$, $Si_4Cl_6Br_4$, $Si_4Cl_5Br_5$, $Si_4Cl_4Br_6$, $Si_4Cl_3Br_7$, $Si_4Cl_2Br_8$, $Si_4ClBr_9$, $Si_4Cl_9F$, $Si_4Cl_8F_2$, $Si_4Cl_7F_3$, $Si_4Cl_6F_4$, $Si_4Cl_5F_5$, $Si_4Cl_4F_6$, $Si_4Cl_3F_7$, $Si_4Cl_2F_8$, $Si_4ClF_9$, $Si_4Br_9I$, $Si_4Br_8I_2$, $Si_4Br_7I_3$, $Si_4Br_6I_4$, $Si_4Br_5I_5$, $Si_4Br_4I_6$, $Si_4Br_3I_7$, $Si_4Br_2I_8$, $Si_4BrI_9$, $Si_4Br_9F$, $Si_4Br_8F_2$, $Si_4Br_7F_3$, $Si_4Br_6F_4$, $Si_4Br_5F_5$, $Si_4Br_4F_6$, $Si_4Br_3F_7$, $Si_4Br_2F_8$, $Si_4BrF_9$, $Si_4I_9F$, $Si_4I_8F_2$, $Si_4I_7F_3$, $Si_4I_6F_4$, $Si_4I_5F_5$, $Si_4I_4F_6$, $Si_4I_3F_7$, $Si_4I_2F_8$, $Si_4IF_9$, $Si_5Cl_{11}Br$, $Si_5Cl_{10}Br_2$, $Si_5Cl_9Br_3$, $Si_5Cl_8Br_4$, $Si_5Cl_7Br_5$, $Si_5Cl_6Br_6$, $Si_5Cl_5Br_7$, $Si_5Cl_4Br_8$, $Si_5Cl_3Br_9$, $Si_5Cl_2Br_{10}$, $Si_5ClBr_{11}$, $Si_5Cl_{11}F$, $Si_5Cl_{10}F_2$, $Si_5Cl_9F_3$, $Si_5Cl_8F_4$, $Si_5Cl_7F_5$, $Si_5Cl_6F_6$, $Si_5Cl_5F_7$, $Si_5Cl_4F_8$, $Si_5Cl_3F_9$, $Si_5Cl_2F_{10}$, $Si_5ClF_{11}$, $Si_5Cl_{11}I$, $Si_5Cl_{10}I_2$, $Si_5Cl_9I_3$, $Si_5Cl_8I_4$, $Si_5Cl_7I_5$, $Si_5Cl_6I_6$, $Si_5Cl_5I_7$, $Si_5Cl_4I_8$, $Si_5Cl_3I_9$, $Si_5Cl_2I_{10}$, $Si_5ClI_{11}$, $Si_5Br_{11}I$, $Si_5Br_{10}I_2$, $Si_5Br_9I_3$, $Si_5Br_8I_4$, $Si_5Br_7I_5$, $Si_5Br_6I_6$, $Si_5Br_5I_7$, $Si_5Br_4I_8$, $Si_5Br_3I_9$, $Si_5Br_2I_{10}$, $Si_5BrI_{11}$, $Si_5Br_{11}F$, $Si_5Br_{10}F_2$, $Si_5Br_9F_3$, $Si_5Br_8F_4$, $Si_5Br_7F_5$, $Si_5Br_6F_6$, $Si_5Br_5F_7$, $Si_5Br_4F_8$, $Si_5Br_3F_9$, $Si_5Br_2F_{10}$, $Si_5BrF_{11}$, $Si_5I_{11}F$, $Si_5I_{10}F_2$, $Si_5I_9F_3$, $Si_5I_8F_4$, $Si_5I_7F_5$, $Si_5I_6F_6$, $Si_5I_5F_7$, $Si_5I_4F_8$, $Si_5I_3F_9$, $Si_5I_2F_{10}$, $Si_5IF_{11}$; alkylalkoxysilanes or alkylsilicic esters (or ethers) such as
$(CH_3)_3SiOH$ (trimethylsilanol),
$(C_2H_5)_3SiOH$ (triethylsilanol),
$(n-C_3H_7)_3SiOH$ (tripropylsilanol),
$(i-C_5H_{11})_3SiOH$ (tri-i-amylsilanol),
$(C_6H_5)_3SiOH$ (triphenylsilanol),
$(p-C_7H_7)_3SiOH$ (tri-p-tolysilanol),
$(C_6H_5CH_2)_3SiOH$ (tribenzylsilanol),
$(CH_3)(C_2H_5)(C_6H_6)SiOH$ (methylethylphenylsilanol),
$(C_2H_5)_2(C_6H_5)SiOH$ (diethylphenylsilanol),
$(C_2H_5)(n-C_3H_7)(C_6H_5)SiOH$ (ethylpropylphenylsilanol),
$CH_3(C_6H_5CH_2)_2SiOH$ (methyldibenzylsilanol),
$C_2H_5(C_6H_5CH_2)_2SiOH$ (ethyldibenzylsilanol),
$(C_2H_5)_2(C_6H_5CH_2)SiOH$ (diethylbenzylsilanol),
$(C_2H_5)(n-C_3H_7)(C_6H_5CH_2)SiOH$ (ethylpropylbenzylsilanol),
$(C_2H_5)(i-C_4H_9)(C_6H_5CH_2)SiOH$ (ethyl-i-butylbenzylsilanol),
$(C_6H_5)_2Si(OH)_2$ (diphenylsilanediol),
$(C_6H_5CH_2)_2Si(OH)_2$ (dibenzylsilanediol),
$C_2H_5(C_6H_5)Si(OH)_2$ (ethylphenylsilanediol),
$C_2H_5(C_6H_5CH_2)Si(OH)_2$ (ethylbenzylsilanediol),
$(CH_3)_3SiOCH_3$ (trimethylmethoxysilane),
$(CH_3)_3SiOC_2H_5$ (trimethylethoxysilane),
$(CH_3)_3SiOC_4H_9$ (trimethylbutoxysilane),
$(CH_3)_2Si(OC_2H_5)_2$ (dimethyldiethoxysilane),
$(CH_3)_2Si(OC_4H_9)_2$ (dimethyldibutoxysilane),
$(C_2H_5)_2Si(OC_2H_5)_2$ diethyldiethoxysilane),
$(C_6H_5C{\equiv}C)_2Si(OC_2H_5)_2$ (diphenylethynyldiethoxysilane),
$CH_3Si(OC_2H_5)_3$ (methyltriethoxysilane),
$CH_3Si(OC_4H_9)_3$ (methyltributoxysilane),
$C_2H_5Si(OCH_3)_3$ (ethyltrimethoxysilane),
$C_2H_5Si(OC_2H_5)_3$ (ethyltriethoxysilane),
$i-C_3H_7Si(OC_2H_5)_3$ (isopropyltriethoxysilane),
$i-C_4H_9Si(OC_2H_5)_3$ (isobutyltriethoxysilane),
$i-C_5H_{11}Si(OC_2H_5)_3$ (isoamyltriethoxysilane),
$C_6H_{13}Si(OC_2H_5)_3$ (hexyltriethoxysilane),
$C_3H_5Si(OC_2H_5)_3$ (allyltriethoxysilane),
$C_6H_5Si(OC_2H_5)_3$ (phenyltriethoxysilane),
$C_6H_5Si(OC_6H_5)_3$ (phenyltriphenoxysilane),
$C_6H_5CH_2Si(OC_2H_5)_3$ (benzyltriethoxysilane),
$C_6H_5C{\equiv}C-Si(OC_2H_5)_3$ (trimethylbutoxysilane),
$Si(OC_2H_5)_4$ (ethyl silicate), $HSi(OC_2H_5)_3$, $H_2Si(OC_2H_5)_2$, $H_3Si(OC_2H_5)$, $Si(OCH_3)_4$ (methyl silicate), $HSi(OCH_3)_3$, $H_2Si(OCH_3)_2$, $H_3Si(OCH_3)$, $Si(OC_3H_7)_4$, $HSi(OC_3H_7)_3$, $H_2Si(OC_3H_7)_2$, $H_3Si(OC_3H_7)$, $Si(OC_4H_9)_4$, $HSi(OC_4H_9)_3$, $H_2Si(OC_4H_9)_2$, $H_3Si(OC_4H_9)$, $Si(OC_6H_{13})_4$, $HSi(OC_6H_{13})_3$, $H_2Si(OC_6H_{13})_2$, $H_3Si(OC_6H_{13})$ $(SiH_3)_2O$ (disiloxane),
$(SiCl_3)_2O$ (hexachlorodisiloxane),
$(SiBr_3)_2O$ (hexabromodisiloxane),
$Si(OC_6H_5)_4$ (phenyl silicate),
$Si(OC_5H_{11})_4$ (amyl silicate),
$Si(OC_7H_7)_4$ (benzyl silicate),
$(CH_3O)_6Si_2O$ (hexamethoxydisiloxane),
$(C_2H_5O)_6Si_2O$ (hexaethoxydisiloxane).

The silicon source may also include $H_2SiO_3$ (meta silicic acid), $H_4SiO_4$ (ortho silicic acid), $SiHBr_3$ (silico bromoform), $SiHCl_3$ (silico chloroform), $SiHF_3$ (silico fluoroform), $SiHI_3$ (silico iodoform), $Si_2O_2(OH)_2$ (silico oxalic acid), $SiB_3$ (silicon triboride), $SiB_6$ (silicon hexaboride), $Si_2Br_6$ (silicon tribromide), $(C_2H_5)_2(C_6H_5)_2Si$ (diethyldiphenylsilane), $C_2H_5(C_6H_5)_3Si$ (ethyltriphenylsilane), $(CH_3)(C_2H_5)(n-C_3H_7)(C_6H_5)Si$ (methylethylpropylphenylsilane), $(C_2H_5)(n-C_3H_7)(i-C_4H_9)(CH_2C_6H_5)Si$
(ethyl-n-propyl-i-butylbenzylsilane), $(C_2H_5)_3SiF$ (triethylfluorosilane), $(n-C_3H_7)_3SiF$ (tripropylfluorosilane),
$(n-C_4H_9)_3SiF$ (tributylfluorosilane),
$(n-C_5H_{11})_3SiF$ (triamylfluorosilane),
$(C_6H_5)_3SiF$ (triphenylfluorosilane),
$(C_6H_5CH_2)_3SiF$ (tribenzylfluorosilane),
$(CH_3)_3SiCl$ (trimethylchlorosilane),
$(CH_3)_3SiBr$ (trimethylbromosilane),
$(C_2H_5)_3SiCl$ (triethylchlorosilane),
$(C_2H_5)_3SiBr$ (triethylbromosilane),
$(n-C_3H_7)_3SiBr$ (tripropylbromosilane),
$(i-C_4H_9)_3SiBr$ (triisobutylbromosilane),
$(i-C_5H_{11})_3SiBr$ (triisoamylbromosilane),
$(C_6H_5)_3SiCl$ (triphenylchlorosilane),
$(C_6H_5)_3SiBr$ (triphenylbromosilane),
$(p-C_7H_7)_3SiCl$ (tri-p-tolylchlorosilane),
$(C_6H_5CH_2)_3SiCl$ (tribenzylchlorosilane),
$(CH_2{=}CHCH_2)(CH_3)_2SiCl$ (allyldimethylchlorosilane),
$C_2H_5(C_6H_5)_2SiCl$ (ethyldiphenylchlorosilane),
$(C_6H_5)(C_2H_5)(n-C_3H_7)SiCl$ (phenylethylpropylchlorosilane),
$(C_6H_5CH_2)(C_2H_5)(n-C_3H_7(SiCl$ (benzylethylpropylchlorosilane),
$(C_6H_5CH_2)(C_2H_5)(i-C_4H_9)SiCl$ (benzylethyl-i-butylchlorosilane),
$(CH_3)_2SiBr_2$ (dimethyldibromosilane),
$(CH_3)_2SiCl_2$ (dimethyldichlorosilane),
$(C_2H_5)_2SiCl_2$ (diethyldichlorosilane),
$(CH_2{=}CH)_2SiCl_2$ (divinyldichlorosilane),
$(n-C_3H_7)_2SiCl_2$ (dipropyldichlorosilane),
$(CH_2{=}CHCH_2)(allyldichlorosilane),
$(CH_2{=}CHCH_2)_2SiCl_2$ (diallyldichlorosilane), $(C_6H_5)_2SiCl_2$ (diphenyldichlorosilane),
$(p\text{-}BrC_6H_4)_2SiCl_2$ (di-p-bromophenyldichlorosilane),
$(C_6H_5)_2SiBr_2$ (diphenyldibromosilane),
$(p\text{-}C_7H_7)_2SiCl_2$ (di-p-tolyldichlorosilane),
$(C_6H_5CH_2)_2SiCl_2$ (dibenzyldichlorosilane),
$(CH_2\!=\!CH)(CH_3)SiCl_2$ (vinylmethyldichlorosilane),
$(CH_2\!=\!CHCH_2)(CH_3)SiCl_2$ (allylmethyldichlorosilane),
$C_2H_5(n\text{-}C_3H_7)SiCl_2$ (ethylpropyldichlorosilane),
$C_2H_5(i\text{-}C_4H_9)SiCl_2$ (ethylisobutyldichlorosilane),
$C_2H_5(C_6H_5)SiCl_2$ (ethylphenyldichlorosilane),
$C_2H_5(C_6H_5CH_2)SiCl_2$ (ethylbenzyldichlorosilane),
$C_6H_5(C_6H_5CH_2)SiCl_2$ (phenylbenzyldichlorosilane),
$C_6H_5(p\text{-}BrC_6H_4)SiCl_2$ (phenyl-p-bromophenyldichlorosilane),
$CH_3SiCl_3$ (methyltrichlorosilane),
$C_2H_5SiCl_3$ (ethyltrichlorosilane),
$CH_2\!=\!CH\text{—}SiCl_3$ (vinyltrichlorosilane),
$n\text{-}C_3H_7SiCl_3$ (propyltrichlorosilane),
$CH_2\!=\!CHCH_2SiCl_3$ (allyltrichlorosilane),
$n\text{-}C_4H_9SiCl_3$ (butyltrichlorosilane),
$i\text{-}C_4H_9SiCl_3$ (isobutyltrichlorosilane),
$i\text{-}C_5H_{11}SiCl_3$ (isoamyltrichlorosilane),
$C_6H_5SiCl_3$ (phenyltrichlorosilane),
$C_6H_{11}SiCl_3$ (cyclohexyltrichlorosilane),
$p\text{-}C_7H_7SiCl_3$ (p-tolyltrichlorosilane),
$C_6H_5CH_2SiCl_3$ (benzyltrichlorosilane),
$a\text{-}C_{10}H_7SiCl_3$ (a-naphthyltrichlorosilane),
$CH_3SiBr_3$ (methyltribromosilane),
$(CH_3)_3SiOH$, $(CH_3)_6Si_2$ (hexamethyldisilane),
$(C_2H_5)_6Si_2$ (hexaethyldisilane),
$(C_3H_7)_6Si_2$ (hexa-n-propyldisilane),
$(C_2H_5)_2(C_3H_7)_2(C_6H_5)_2Si_2$ (diethyldipropyldiphenyldisilane),
$(C_2H_5)_2(C_3H_7)_2(C_7H_7)_2Si_2$ (diethyldipropyldibenzyldisilane),
$(C_6H_5)_6Si_2$ (hexaphenyldisilane),
$(C_7H_7)_6Si_2$ (hexa-p-tolyldisilane or hexabenzyldisilane),
—$(C_6H_5)_8Si_4$— (octaphenyltetrasilane),
$[(C_6H_5)_2Si]_4$ (cyclooctaphenyltetrasilane),
—$(C_7H_7)_8Si_4$— (octa-p-tolyltetrasilane),
$[(p\text{-}C_7H_7)_2Si]_4$ (cycloocta-p-tolyltetrasilane),
$(C_3H_7)_6Si_2O$ (hexapropyldisiloxane),
$(C_2H_5)_6Si_2O$ (hexaethyldisiloxane,
$(CH_3)_6Si_2NH$ (hexamethyldisilazane),
$(CH_3)_6Si_2O$ (hexamethyldisiloxane),
$(C_7H_7)_8Si_4O_2$ (cyclooctaphenyltetrasilane oxide or dioxide),
$(C_6H_5O)_2(C_6H_5)_8Si_4$, $(C_5H_{11})_6Si_2O$ (hexaisoamyldisiloxane),
$(C_6H_5)_6Si_2O$ (hexaphenyldisiloxane),
$(C_7H_7)_6Si_2O$ (hexa-p-tolyldisiloxane),
$(CH_3)_2(C_6H_5)_4Si_2O$ (dimethyltetraphenyldisiloxane),
$(C_2H_5)_2(C_6H_5)_4Si_2O$ (diethyltetraphenyldisiloxane),
$(C_2H_5)_2(n\text{-}C_3H_7)_2Si_2O$ (diethyldipropyldibenzyldisiloxane,
$(C_2H_5)_2(i\text{-}C_4H_9)_2(C_7H_7)_2Si_2O$ (diethyldibutyldibenzyldisiloxane),
$(C_6H_5)_4Si_2O(OH)_2$ (tetraphenyldisiloxane-1,3-diol),
$(C_6H_5)_6Si_3O_2(OH)_2$ (hexaphenyltrisiloxane-1,5-diol),
$(C_2H_5)_2(C_6H_5)_2Si_2O(OH)_2$ (diethyldiphenyldisiloxane-1,3-diol),
$(C_7H_7)_4Si_2O(OH)_2$ (tetrabenzyldisiloxane-1,3-diol),
$(C_7H_7)_4Si_3O_2(OH)_2$ (hexabenzyltrisiloxane-1,5-diol),
$(Me_2SiO)_3$ (hexamethylcyclotrisiloxane),
$(Et_2SiO)_3$ (hexaethylcyclotrisiloxane),
$(C_6H_5)_6Si_3O_3$ (hexaphenylcyclotrisiloxane),
$(C_6H_5)_8Si_4O_4$ (octaphenylcyclotetrasiloxane),
$(C_7H_7)_6Si_3O_3$ (hexabenzylcyclotrisiloxane),
$(EtBzSiO)_3$ (triethyltribenzylcyclotrisiloxane).

In addition, applicant incorporates herein by reference all of the silicon compounds listed on pages 166 to 195 of "Silicones and Other Organic Silicon Compounds," by Howard W. Post, Reinhold Publishing Corporation, New York (1949).

Likewise, one or more compounds may be employed as a source of one or more additives, for example, $Al_2(SiF_6)_3$ (aluminum silicofluoride), $CsAl(SO_4)_2 \cdot 12H_2O$ (cesium aluminum sulfate), $KAgBr_4$, $KAg(CN)_2$, $K_2SiF_6$ (potassium fluosilicate), $K_2SiO_3$ (potassium metasilicate), $K_2Si_2O_5$ (potassium disilicate), $KHSi_2O_5$ (potassium hydrogen disilicate), $K_2ZrF_6$ (potassium fluozirconate), $KCl \cdot CaCl_2$ (potassium calcium chloride), $CsSiF_6$ (cesium fluosilicate), $Al_3Ti_2$, $AlCl_3 \cdot \frac{3}{4}ZnCl_2$, $AlCu$, $AlCu_3$, $Al_2Cu$, $CaZn_4$, $CaSiO_4$, $CaSi$, $CaAgC_3N_3$, $CdSiO_3$, and $$CdI_2 \cdot 2KI \cdot 2H_2O$$

Furthermore, there may be employed alloys containing one or more of the aforementioned additives, such as Ag-Cu alloys, particularly an alloy containing 80% Ag–20% Cu, by weight.

Among the above sources listed for aluminum, zirconium, the metallic members of Groups IA, IB, IIA, and IIB, and silicon, there are certain advantages which will accrue from the use of certain classes of material, for example, the halides, particularly the chlorides.

It is particularly advantageous to conduct the vapor phase oxidation in the presence of sources which will react with oxygen at the temperature of the vapor phase oxidation to form the corresponding metal oxide. It is not intended to indicate that the source materials herein listed for aluminum, zirconium, silicon and the members of Groups IA, IB, IIA, IIB must actually form the corresponding metal oxide during the vapor phase oxidation. However, it is advantageous if the source material in this instance is capable of forming a metal oxide, regardless of whether such oxide is formed.

Where a metallic source is a high ionizable salt such as KCl, NaCl, LiCl, $BeCl_2$, RbCl, CsCl, it is not necessary for such compound to be capable of forming an oxide at the vapor phase oxidation temperature; that is, good results are obtained by the addition of a highly ionizable source which is not oxidized at the reaction temperature and which remains substantially unchanged chemically, e.g., as analyzed in an effluent stream from the reactor. Thus, when KCl is added to the vapor phase reaction of $TiCl_4$ and $O_2$, it is not oxidized but may be recovered as KCl.

Furthermore, it is also feasible to employ sources which are not highly ionizable and which do not form oxides at the vapor phase oxidation temperature particularly if such sources are heated to a high temperature by passage through a plasma arc, e.g., in the presence of an inert gas or one of the reactants such as oxygen.

The sources listed hereinbefore may be introduced into the reaction chamber 30 very effectively as solutions in a solvent, e.g., in the form of a spray. Thus, water soluble metal sources of the type herein contemplated can be used in water solutions. Oganic metal sources may be used in many cases where they are liquids or gases, or may be used in solutions in common organic solvents which are not adverse to the vapor phase oxidation.

Typical solvents are chloroform, methylene chloride, or like chlorinated aliphatic or aromatic solvents. Other typical solvents include acetones, ketones, benzenes, and alcohols.

It is also advantageous to use materials which vaporize readily and can be introduced in a vapor state. Thus, zinc metals and various zinc halides are advantageous which are volatile at the vapor phase reaction temperature.

The following is a typical working example representing the best mode contemplated by the inventor in the carrying out of this invention.

*Example*

A burner having the configuration of burner B in FIGURE 3 is employed in conjunction with reaction chamber A' of FIGURE 1.

Titanium tetrachloride ($TiCl_4$) at 1000° C. and 14.7 pounds per square inch absolute pressure is flowed at the rate of 80 millimoles per minute through annulus 17 into reaction zone 30. The $TiCl_4$ contains 3 mole percent of $AlCl_3$ based on the total moles of $TiCl_4$.

Simultaneously, oxygen at 1000° C. and 14.7 pounds per square inch absolute pressure is flowed at 96 millimoles per minute through passage 15 (tube 12) into the reaction zone 30.

A 40 mole percent chlorine shroud (based on the total moles of $TiCl_4$) at 1000° C. and 14.7 pounds per square inch absolute pressure is flowed through annulus 16.

The reaction zone 30 is preheated and maintained at 1000° C.

Varying amounts of different ions from Groups IA, IB, IIA, IIB are added to the oxygen stream. The $AlCl_3$ addition to the $TiCl_4$ is held constant at 3 mole percent.

All ions were added as chlorides, e.g., KCl, CsCl, RbCl, $BaCl_2$, $BeCl_2$, AgCl, $ZnCl_2$ and $SiCl_4$.

The titanium oxide pigment formed in zone 30 is withdrawn at exit 7 entrained in a gaseous effluent stream. The raw pigment is recovered and is wet coated with hydrous alumina and titania in accordance with the process of U.S. Letters Patent 3,146,119 issued to Dr. Hartien S. Ritter.

The results are tabulated in Table I. All additives are expressed in parts by weight of the particular metallic ion per million parts by weight titanium oxide pigment formed.

Both raw and coated tinting strength (T.S.) are given for the pigment, as well as raw and uncoated tint tone (T.T.).

Conversely, the more brown the pigment, the less pleasing the optical properties of the paint.

The undertone scale to be used ranges from a Brown 10 to a Blue 6 as shown hereinafter in Table II.

TABLE II

| | |
|---|---|
| Brown 10 | Brown 1 |
| Brown 9 | Neutral |
| Brown 8 | Blue 1 |
| Brown 7 | Blue 2 (Standard) |
| Brown 6 | Blue 3 |
| Brown 5 | Blue 4 |
| Brown 4 | Blue 5 |
| Brown 3 | Blue 6 |
| Brown 2 | |

While the invention has been described by reference to specific details of certain embodiments, it is not intended that the invention be construed as limited to such details except insofar as they appear in the appended claims.

I claim:

1. A process of preparing pigmentary titanium oxide, which comprises reacting a titanium tetrahalide selected from the group consisting of titanium tetrachloride, titanium tetrabromide, and titanium tetraiodide with an oxygenating gas in the vapor phase in the presence of an effective amount of at least one rutile promoting agent, an effective amount of zinc ion, an effective amount of a metallic ion selected from the metals of Groups IA, IB, and IIA, and cadmium, and an effective amount of a source of silicon ion.

TABLE I

| Run No. | Additives to $O_2$, p.p.m. Titanium Oxide | Pigment, Raw T.S. | Pigment, Coated T.S. | Pigment, Raw T.T. | Pigment, Coated T.T. |
|---|---|---|---|---|---|
| 1 | None | 1,500 | 1,550 | Brown 10 | Brown 4. |
| 2 | 4,000 Zn, 100 K | 1,720 | 1,820 | Blue 1 | Blue 3. |
| 3 | 3,000 Zn, 50 K | 1,710 | 1,800 | Blue 2 | Do. |
| 4 | 3,500 Zn, 100 K | 1,710 | 1,810 | Blue 1 | Do. |
| 5 | 3,500 Zn, 1,000 Cs | 1,690 | 1,780 | Brown 1 | Blue 2. |
| 6 | 2,000 Rb, 100 K | 1,700 | 1,790 | Neutral | Blue 3. |
| 7 | 2,000 Rb, 1,000 Cs | 1,700 | 1,780 | do | Blue 2. |
| 8 | 2,000 Cs, 100 K | 1,710 | 1,790 | Blue 1 | Do. |
| 9 | 4,000 Zn, 100 K, 2,000 Si | 1,750 | 1,850 | Blue 2 | Blue 5. |
| 10 | 4,000 Zn, 3,000 Ba | 1,690 | 1,750 | Brown 2 | Blue 1. |
| 11 | 4,000 Zn, 3,000 Be | 1,700 | 1,760 | Neutral | Blue 2. |
| 12 | 4,000 Zn, 2,500 Ag | 1,700 | 1,760 | do | Blue 1. |
| 13 | 4,000 Zn, 3,000 Be, 2,500 Si | 1,710 | 1,780 | Blue 1 | Blue 3. |
| 14 | 4,000 Zn, 2,500 Ag, 2,500 Si | 1,710 | 1,770 | do | Blue 2. |

The tinting strength of pigmentary titanium dioxide may be determined by any of several methods known in the paint industry. One such method is the Reynold's Blue Method, A.S.T.M. D-332-26, "1949 Book of A.S.T.M. Standards," part 4, page 31, published by American Society for Testing Material, Philadelphia 3, Pennsylvania.

Tint tone or undertone of a titanium dioxide pigment sample is determined by visually comparing a paste of the pigment with a paste of a selected standard.

In the example hereinbefore, a paste of a sample from each run and a paste of a standard is prepared in accordance with A.S.T.M. D-332-36 using carbon black to tint each sample paste to the same depth of grey as the standard.

The standard used has an oil absorption rating of 20.9 as determined by A.S.T.M. D-281-31, an average particle size of 0.25 micron as determined with an electron micrograph, and an assigned undertone value of Blue 2.

The samples obtained from the runs in the example are compared with the standard and an undertone value assigned to the sample by stating whether the sample is bluer or browner than the designated standard.

The more blue a pigment is, the more pleasing are the optical properties of a paint prepared from the pigment.

2. A process according to claim 1 wherein said metallic ion is potassium ion.

3. A process according to claim 1 wherein said rutile promoting agent is a source of aluminum ion.

4. A process according to claim 1 wherein the total amount of rutile promoting agent and other metallic ions does not exceed 10 weight percent, basis titanium oxide formed.

5. A process of preparing pigmentary titanium oxide having improved pigmentary properties, which comprises reacting a titanium tetrahalide selected from the group consisting of titanium tetrachloride, titanium tetrabromide, and titanium tetraiodide with an oxygenating gas in the vapor phase at a temperature of at least 800° C. in the presence of:

(a) from 0.5 to 10.0 mole percent, basis moles of titanium oxide, of a metal ion selected from the group consisting of aluminum and zirconium ion, (b) from 0.01 to 10,000 parts, per million parts of titanium oxide, of zinc ion, (c) from 0.01 to 10,000 parts, per million parts of titanium oxide, of a metallic ion selected from the metals of Groups IA, IB, and IIA, and cadmium, and (d) from 0.001 to 2.7 mole percent, basis moles of titanium oxide, of silicon ion.

6. A process according to claim 5 wherein said metallic ion selected from the metals of Groups IA, IB, and IIA, and cadmium is potassium ion.

7. A process of preparing pigmentary titanium oxide which comprises reacting a titanium tetrahalide selected from the group consisting of titanium tetrachloride, titanium tetrabromide, and titanium tetraiodide with oxygen in the vapor phase at a temperature of at least 800° C. in the presence of:
(a) from 0.5 to 10.0 mole percent, basis moles of titanium oxide, of a metal ion selected from the group consisting of aluminum and zirconium ion,
(b) from 5 to 5,000 parts, per million parts by weight titanium oxide, of zinc ion,
(c) from 5 to 5,000 parts, per million parts by weight titanium oxide, of potassium ion, and
(d) from 0.01 to 2 mole percent, basis moles of titanium oxide, of silicon ion; such that the total amount of said metallic ions does not exceed 10 weight percent, basis titanium oxide formed.

8. A process according to claim 7 wherein the total amount of metallic ions does not exceed 4.0 weight percent, basis titanium oxide formed.

9. A process of preparing pigmentary titanium oxide of improved tinting strength and tint tone which comprises reacting titanium tetrachloride with oxygen in the vapor phase at a temperature of at least 800° C. in the presence of 0.5 to 3.0 mole percent, basis titanium oxide, of aluminum chloride, 5 to 5,000 parts per million parts titanium oxide of potassium ion, 5 to 5,000 parts per million parts titanium oxide, of zinc ion, and from 0.2 to 1.2 mole percent, basis titanium oxide, of silicon ion.

10. A process according to claim 9 wherein the source of potassium, zinc, and silicon are their respective chlorides.

11. A process of preparing pigmentary titanium oxide of improved tinting strength and tint tone which comprises reacting titanium tetrachloride with oxygen in the vapor phase at a temperature of at least 800° C. in the presence of 3 mole percent of aluminum chloride, basis titanium oxide, 4,000 parts per million parts of titanium oxide of zinc ion, 100 parts per million parts of titanium oxide of potassium ion, and 2,000 parts per million parts of titanium oxide of silicon ion.

12. In a process of preparing pigmentary titanium oxide wherein a titanium tetrahalide selected from the group consisting of titanium tetrachloride, titanium tetrabromide, and titanium tetraiodide is reacted in the vapor phase at a temperature of at least 800° C. with oxygen, the improvement which comprises carrying out said reaction in the combined presence of:
(a) from 0.5 to 10.0 mole percent, basis moles of titanium oxide, of a metal ion selected from the group consisting of aluminum and zirconium ion,
(b) from 0.01 to 10,000 parts, per million parts of titanium oxide, of metallic zinc ion,
(c) from 0.01 to 10,000 parts, per million parts of titanium oxide, of a metallic ion selected from the metals of Groups IA, IB, and IIA, and cadmium, and
(d) from 0.001 to 2.7 mole percent, basis moles of titanium oxide, of silicon ion.

References Cited
UNITED STATES PATENTS

| | | | |
|---|---|---|---|
| 2,957,753 | 10/1960 | Nelson et al. | 23—202 |
| 2,980,509 | 4/1961 | Frey | 23—202 |
| 3,068,113 | 12/1962 | Strain et al. | 23—202 |
| 3,208,866 | 9/1965 | Lewis et al. | 23—202 X |
| 3,214,284 | 10/1965 | Wilson | 106—300 |

OSCAR R. VERTIZ, *Primary Examiner.*

EDWARD STERN, MILTON WEISSMAN, *Examiners.*